(12) United States Patent
Tsai

(10) Patent No.: US 7,097,341 B2
(45) Date of Patent: Aug. 29, 2006

(54) LIGHT GUIDE PLATE AND SURFACE LIGHT SOURCE

(75) Inventor: Kun-Jung Tsai, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 143 days.

(21) Appl. No.: 10/652,437

(22) Filed: Aug. 28, 2003

(65) Prior Publication Data

US 2004/0125590 A1     Jul. 1, 2004

(30) Foreign Application Priority Data

Dec. 27, 2002    (TW)    .............................. 91221273 U

(51) Int. Cl.
*F21V 7/04* (2006.01)
(52) U.S. Cl. .................... 362/625; 362/331; 349/61
(58) Field of Classification Search .................. 362/31, 362/26, 561, 327, 331, 612, 613, 625; 349/61, 349/64, 65
See application file for complete search history.

(56) References Cited

U.S. PATENT DOCUMENTS

| 4,373,282 A | * | 2/1983 | Wragg ......................... 40/546 |
| 5,461,547 A | * | 10/1995 | Ciupke et al. .............. 362/617 |
| 5,971,559 A | * | 10/1999 | Ishikawa et al. ............ 362/625 |
| 6,332,691 B1 | | 12/2001 | Oda et al. |
| 6,799,860 B1 | * | 10/2004 | Nakaoka et al. .............. 362/31 |

* cited by examiner

*Primary Examiner*—John Anthony Ward
(74) *Attorney, Agent, or Firm*—Wei Te Chung

(57) ABSTRACT

A light guide plate (32) used in a surface light source (30) for a liquid crystal display includes a light incidence surface (321) for receiving light beams, an emission surface (325) perpendicular to the light incidence surface for emitting the light, a bottom surface (323) opposite to the emission surface, and a plurality of grooves (327) and light reflection dots (329) formed on the bottom surface. The grooves are formed in a continuous band adjacent to the light incidence surface and extend perpendicular to the light incidence surface for scattering the light beams. The light guide plate provides highly uniform illumination for a liquid crystal display panel.

18 Claims, 3 Drawing Sheets

LIGHT GUIDE PLATE AND SURFACE LIGHT SOURCE

BACKGROUND OF THE INVENTION

1. Field of the Invention

The present invention relates to a light guide plate and a surface light source using the same, and especially to a light guide plate providing highly uniform illumination.

2. Description of Related Art

Recently, color liquid crystal display devices have been widely used in various applications, such as in portable personal computers, liquid crystal display televisions, video built-in type liquid crystal televisions, etc. This kind of liquid crystal display device comprises a back light unit and a liquid crystal panel. An under-lighting system in which a light source is disposed just under the liquid crystal panel, or an edge-lighting system in which a light source is disposed on a side surface of a light guide plate, is used as the back light unit.

Recently, edge-lighting systems have been more frequently used because they allow a size of the liquid crystal display device to be reduced. In the edge-lighting system, the light source is disposed at a side surface of the light guide plate, and the light guide plate uniformly emits light from an emission surface, which illuminates the liquid crystal panel. Thus, an edge-lighting system is also called a "surface light source".

In such a surface light source, the light guide plate is formed from a planar transparent member such as an acrylic resin plate or the like. Light beams emitted from a light source, such as a cold cathode fluorescent lamp (CCFL) or a light emitting diode (LED), are transmitted through a side surface (light incidence surface) into the light guide plate. The incident light beams are totally internally reflected in the light guide plate between a light emission surface and a bottom surface of the light guide plate, and then transmit out through the light guide plate. A plurality of light reflection dots having a light scattering function are formed on the bottom surface to increase the uniformity of illumination provided by the light guide plate.

A conventional surface light source 10 as shown in FIG. 5 has a light source 110 and a light guide plate 12 having a bottom surface 120 and a light incidence surface 140 adjacent to the light source 110. Because the light source 110 is a linear light source, the illumination it provides is not uniform, being highest at a center portion of the light source 110, and being lower at the two ends. As a result, the light guide plate 12 has dark regions 130 on two corners of the bottom surface 120. Thus, the illumination provided through the light emitting surface (not shown) is non-uniform and a high-quality display image cannot be obtained in a liquid crystal display using the surface light source 10.

FIG. 6 shows another conventional surface light source 20. The surface light source 20 includes a plurality of LEDS 210 used as light sources, and a light guide plate 22 having a light incidence surface 240 and a bottom surface 220. The LEDs 210 emit light beams into the light guide plate 22 within an incident angle range of about 130 degrees, so that a plurality of areas outside the light incident angle range of the LEDs 210 become dark regions 230, since fewer light beams enter thereinto. The illumination provided by the light emitting surface (not shown) is also non-uniform.

In order to solve the above problems, various proposals have been made, including increasing the number of LEDs or increasing a distance between the light source and the light guide plate. Although illumination uniformity can be achieved, a cost of the surface light source is increased or a size of the surface light source is increased.

SUMMARY OF THE INVENTION

An object of the present invention is to provide a light guide plate which provides highly uniform illumination for a liquid crystal display.

Another object of the present invention is to provide a surface light source using the light guide plate.

A surface light source includes a light source and a light guide plate. The light guide plate includes a light incidence surface for receiving light beams, an emission surface perpendicular to the light incidence surface for outputting the light beams, and a bottom surface opposite to the emission surface. An array of grooves, and a plurality of light reflection dots are formed on the bottom surface. The array of grooves is adjacent to the light incidence surface.

The grooves in the array are formed perpendicular to the light incidence surface, preferably in a continuous band. A pitch of the grooves is preferably between 20 millimeters and 5 mm.

Each of the grooves has a given radius of curvature. When the light source emits light beams into the light guide plate in a horizontal direction through the light incidence surface, a part of the light beams directly transmits into the light guide plate, and another part of the light beams propagates into the grooves. The light beams propagating into the grooves are reflected in all directions by the grooves, thereby enlarging areas covered by the light beams. After that, light beams propagating in the light guide plate are scattered and reflected upwardly to the emission surface by the reflection dots on the bottom surface. As a result, the light beams emitted through the emission surface are emitted more uniformly over the whole area of the emission surface. Thus, the light guide plate provides highly uniform illumination.

Other objects, advantages, and novel features of the present invention will become more apparent from the following detailed description when taken in conjunction with the accompanying drawings; in which:

DETAILED DESCRIPTION OF THE INVENTION

Figure 1:
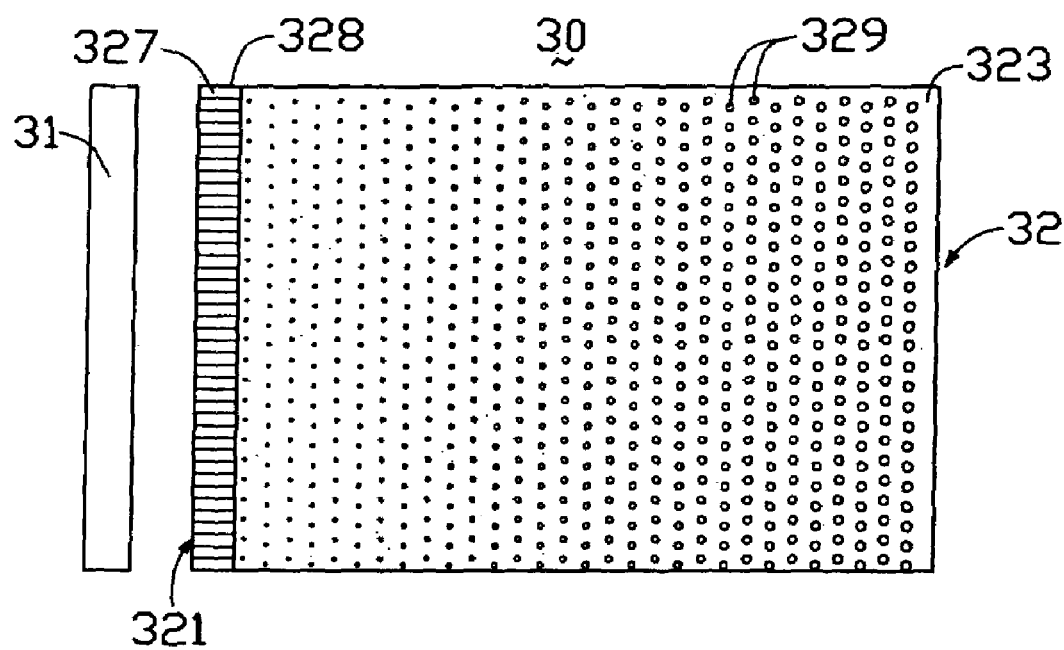
FIG. 1 is a bottom view of a surface light source according to the present invention.

FIG. 1 shows a bottom view of a surface light source 30, which has a light source 31 and a light guide plate 32 used to transmit light from the light source 31.

Figure 2:
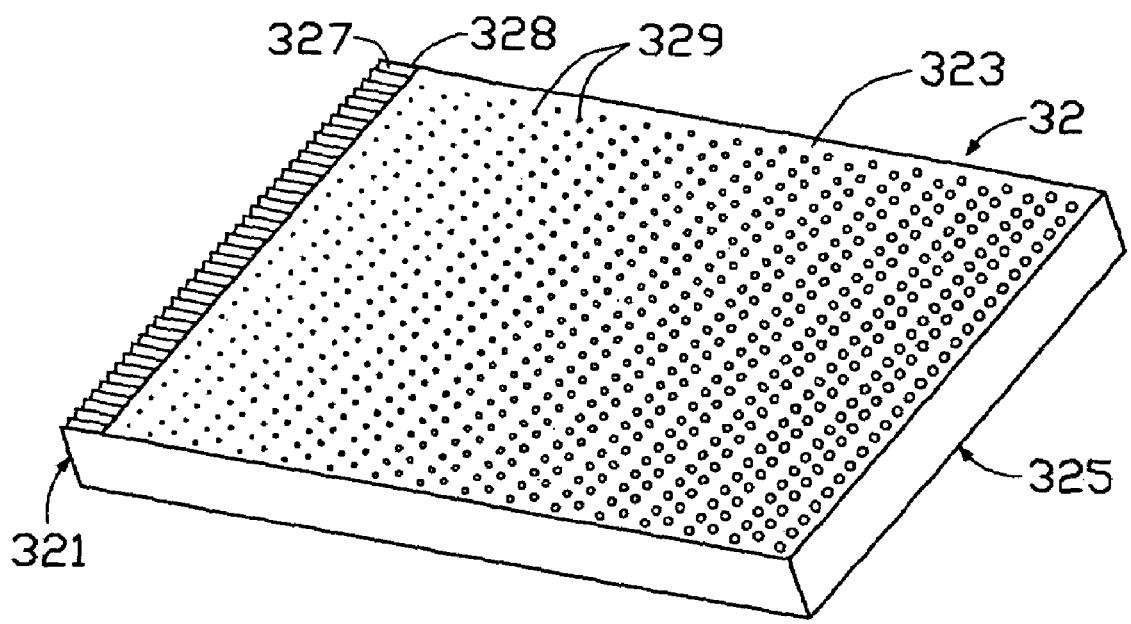
FIG. 2 is a perspective view of a light guide plate in FIG. 1.

FIG. 2 is a perspective view of the light guide plate 32 in FIG. 1, which is in a shape of a rectangular plate. It can instead have a shape of a wedge-plate. The thickness thereof is generally approximately 1_mm to 10 mm. The light guide plate 32 includes a light incidence surface 321, an emission surface 325 perpendicular to the light incidence surface 321, and a bottom surface 323 opposite to the emission surface 325. A groove array 328 and a plurality of reflection dots 329 are formed on the bottom surface 323, wherein the groove array 328 is adjacent to the light incidence surface 321.

In the present invention, a transparent glass or synthetic resin may be used to make the light guide plate 32. Various kinds of highly transparent synthetic resins may be used, such as acrylic resin, polycarbonate resin, vinyl chloride resin, etc. These resins may be molded into a planar member using a normal molding method, such as an extrusion molding method, an injection molding method, or the like. In particular, polymethylmethacrylate (PMMA) resin is excellent in light transmission, heat resistance, dynamic characteristics, molding performance, processing performance, etc. Thus, it is especially suitable as a material for the light guide plate 32.

Further, inorganic fine particles, such as glass beads, titanium oxide particles or the like, or fine particles made of styrene resin, acrylic resin, silicone resin or the like, may be dispersed as light-scattering material in the light guide plate 32.

The individual reflection dots 329 may have a shape of an ellipsoid, a cylinder, a cube, a pyramid, or another shape. To promote uniform emission of the light beams through the emission surface 325, a size of the reflection dots 329 increases as a distance from the light incidence surface 321 increases.

The reflection dots 329 are made using a screen printing technique which uses a pale or white ink containing a white pigment such as titanium oxide, a mechanical shot blasting technique, a photo-sensing method using sensitized paper, an integral molding technique, or any other appropriate method.

The groove array 328 has a plurality of grooves 327, which are parallel to each other and arranged in a continuous band. The grooves 327 extend perpendicular to the light incidence surface 321 of the light guide plate 32, and each in cross-section has a hemicycle shape. Each groove 327 has a same radius of curvature. A pitch between adjacent grooves 327 can be selected to meet requirements; normally, the pitch is set between 20 mm and 5 mm. Each groove 327 is equal in width and depth, the maximum depth being 0.1 mm.

The grooves 327 may be formed on the bottom surface 323 of the light guide plate 32 by injection molding, a tool cutting method, a laser processing method, or the like.

In operation, the light source 31 emits light beams into the light guide plate 32. In this process, a part of the light beams is directly transmitted into the light guide plate 32 through the light incidence surface 321, and another part of the light beams propagates into the grooves 327. The light beams propagating into the grooves 327 are reflected in all directions by the grooves 327, thereby enlarging the area of the light guide plate 32 which provides illumination. The light beams propagating in the light guide plate 32 are scattered and reflected upwardly to the emission surface 325 by the reflection dots 329 on the bottom surface 323. Due to the design of the light guide plate 32, light emitted from the emission surface 325 is fairly uniform over the entire emission surface 325.

Figure 3:
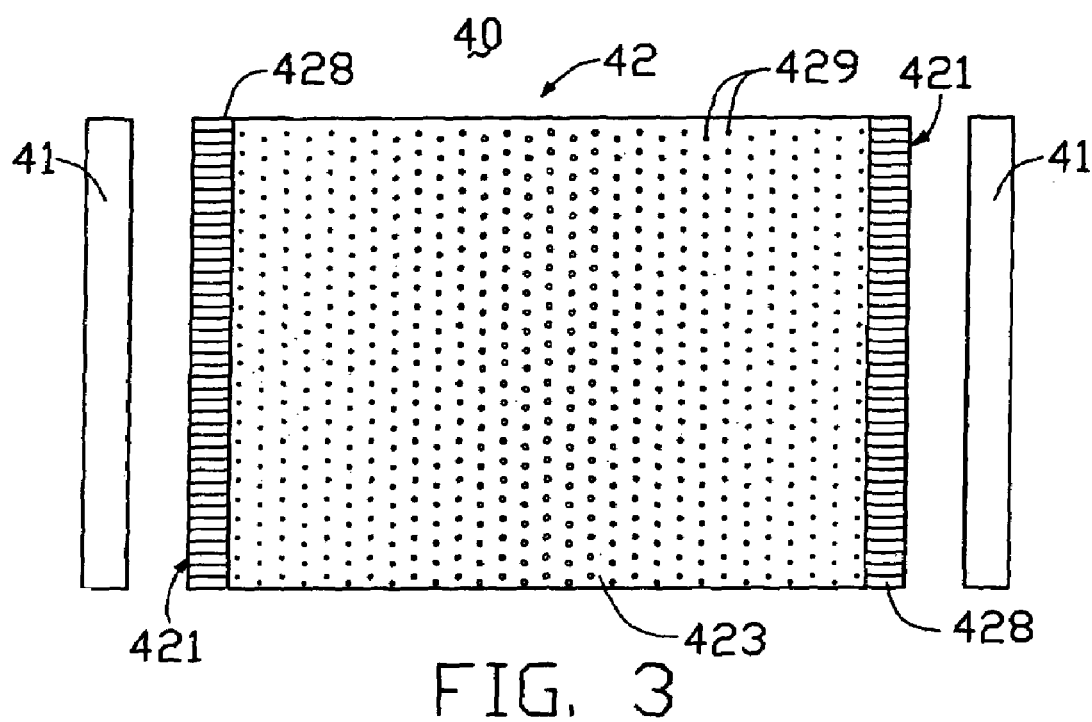
FIG. 3 is a bottom view of a second surface light source according to the present invention.

FIG. 3 is a bottom view showing a second surface light source 40 of the present invention, similar to the surface light source 30. shown in FIG. 1. The differences between the surface light source 40 and the surface light source 30 are described as follows: 1) the surface light source 40 has two light sources 41; 2) the light guide plate 42 has two light incidence surfaces 421; 3) two groove arrays 428 are formed on the bottom surface 423, which each groove array 428 being adjacent to one light incidence surface 421; and 4) a size of the reflection dots 429 is greater as the distance from the nearest light source 41 increases and becomes greatest in a middle area (not labeled) of the bottom surface 423.

Figure 4:
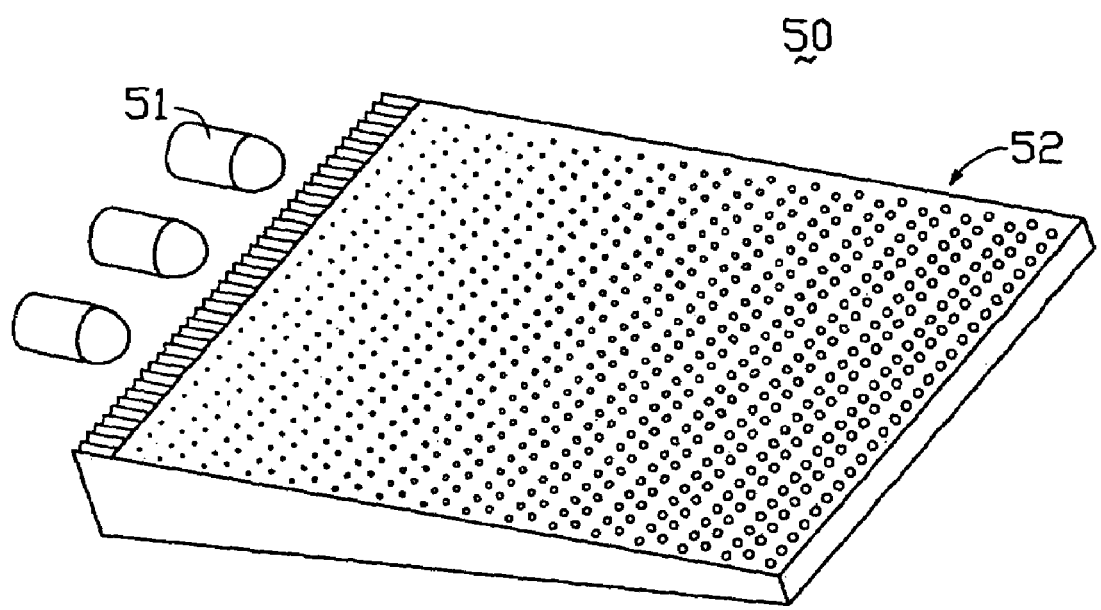
FIG. 4 is a perspective view of a third surface light source according to the present invention.
Figure 5:
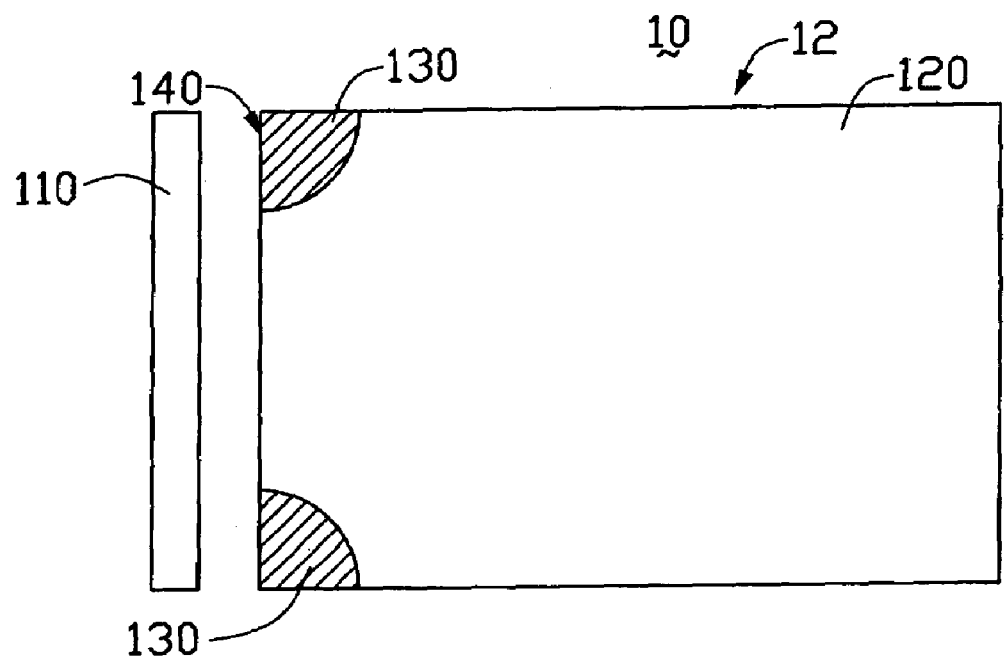
FIG. 5 is a top view of a surface light source of the prior art.
Figure 6:
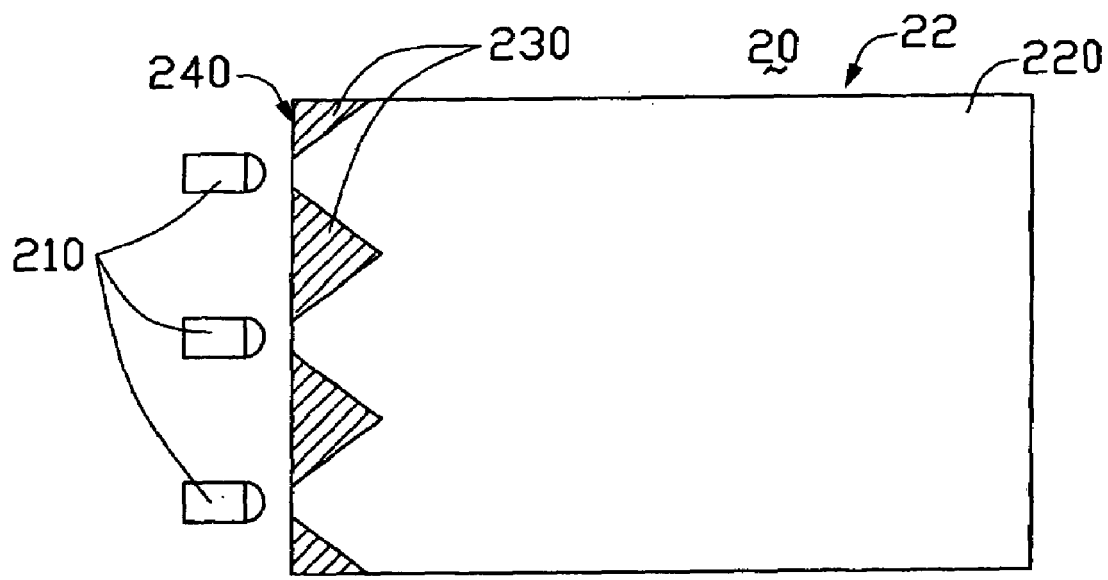
FIG. 6 is a top view of another surface light source of the prior art.

FIG. 4 is a perspective view showing a third surface light source 50 of the present invention similar to the surface light source 30 shown in FIG. 1. The surface light source 50 comprises a plurality of LEDs 51 used as light sources, and a wedge-shaped light guide plate 52 also of the present invention.

The surface light source 30 according to the present invention has some advantages as follows. Firstly, the light beams are reflected toward the emission surface 325 from the bottom surface 323 in a uniform manner, so no dark regions in the light guide plate 32 are apparent. Thus, the light beams are efficiently utilized and uniformly distributed. Secondly, since the size of the reflection dots 329 increases as a distance from the light incidence surface 321 increases, and since the light beams decrease in intensity as they propagate in the light guide plate 32, the amount of light beams reflected by the reflection dots 329 is equal throughout the length of the light guide plate 32. Thus, the surface light source 30 provides highly uniform illumination.

In order to make the light beams emit more uniformly from the light guide plate 32, a plurality of V-grooves or sawtooth-grooves can be defined in the emission surface 325. A diffusing plate or a prism plate can also be disposed on the emission surface 325. The method of forming the V-grooves or sawtooth-grooves may be a V-cut technique, a laser processing method, or a milling cutter method.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A light guide plate for receiving and transmitting light beams, the light beams including a first incident portion and a second incident portion, the light guide plate comprising;
    a light incident surface being configured for receiving the first incident portion of the light beams;
    an emission surface perpendicular to the light incident surface for emitting the light beams;
    a bottom surface opposite to the emission surface; and
    a plurality of grooves formed on the bottom surface, the plurality of grooves being configured for receiving and scattering the second incident portion of the light beams within the light guide plate, the grooves being adjacent to the light incident surface;
    wherein the grooves are defined in a continuous band shape and extend perpendicular to the light incident surface.

2. The light guide plate as claimed in claim 1, wherein each groove has a maximum depth of 0.1 millimeters.

3. The light guide plate as claimed in claim 1, wherein the grooves have substantially equal widths.

4. The light guide plate as claimed in claim 1, wherein a pitch between adjacent grooves is from 5 to 20 millimeters.

5. The light guide plate as claimed in claim 1, wherein each groove has a curved surface having a given curvature radius.

6. The light guide plate as claimed in claim 1, wherein a plurality of V-grooves is formed on the emission surface.

7. The light guide plate as claimed in claim 1, wherein the light guide plate is a rectangular plate.

8. The light guide plate as claimed in claim 1, wherein the light guide plate is a wedge-shaped plate.

9. A surface light source, comprising:
   a light source for emitting light beams; and
   a light guide plate for transmitting the light beams, wherein the light guide plate has a light incident surface being configured for receiving a first portion of the light beams, an emission surface perpendicular to the light incident surface for emitting the light beams, a bottom surface opposite to the emission surface, and a plurality of concave structures formed on the bottom surface, the plurality of concave structures being confleured for receiving and scattering a second portion of the light beams within the light guide plate, the concave structures being adjacent to the light incident surface;
   wherein the concave structures are formed in a continuous band shape and extend perpendicular to the light incident surface.

10. The surface light source as claimed in claim 9, wherein the light source is a plurality of light emitting diodes.

11. The surface light source as claimed in claim 9, wherein each concave structure has a maximum depth of 0.1 millimeters.

12. The surface light source as claimed in claim 9, wherein the concave structures have substantial equal widths.

13. The surface light source as claimed in claim 9, wherein a pitch between adjacent concave structures is from 5 to 20 millimeters.

14. The surface light source as claimed in claim 9, wherein each concave structure has a curved surface having a given curvature radius.

15. The surface light source as claimed in claim 9, wherein a plurality of V-grooves is formed on the emission surface.

16. The surface light source as claimed in claim 9, wherein the light guide plate is a rectangular plate.

17. The surface light source as claimed in claim 9, wherein the light guide plate is a wedge-shaped plate.

18. A light guide plate assembly, comprising:
   a light guide plate, comprising:
   a light incident surface;
   a light emission surface being perpendicular to said light incident surface;
   a bottom surface opposite to said light emission surface, wherein a light source assembly extends beside said light incident surface in a parallel relation; and a plurality of densely parallel arranged grooves is formed in said bottom surface in the form of a band extending along an edge region of said bottom surface adjacent to said light incident surface;
   wherein each of said grooves includes an outer end communicating with said light incident surface and an inner end terminated and embedded in the light guide plate.

* * * * *